Sept. 30, 1958
P. LANDRUM
2,854,107
CENTRIFUGAL CLUTCH FOR HYDRAULIC
TRANSMISSIONS AND THE LIKE
Filed June 8, 1953
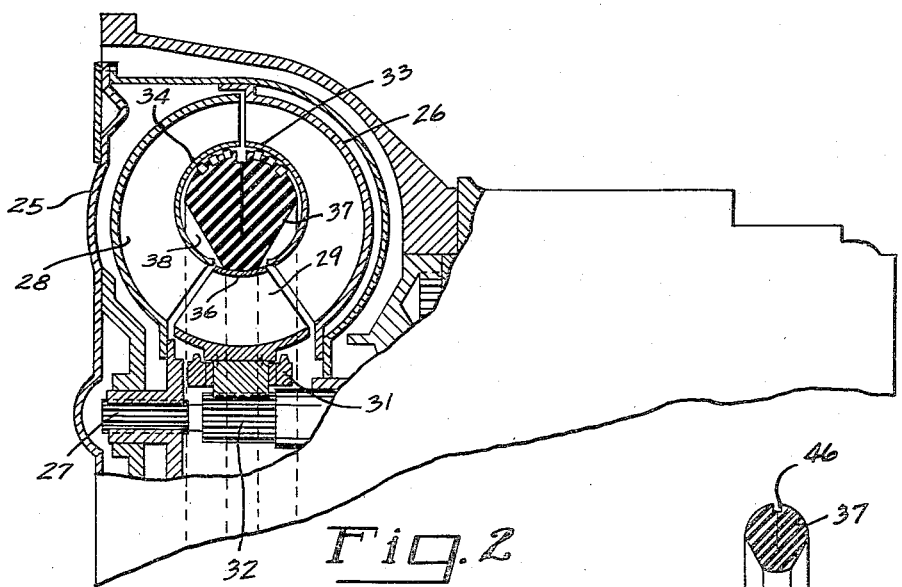
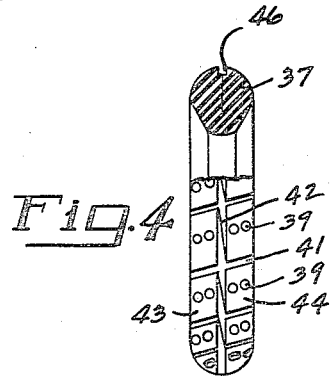
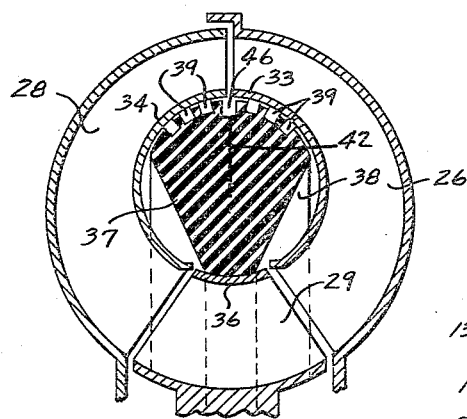
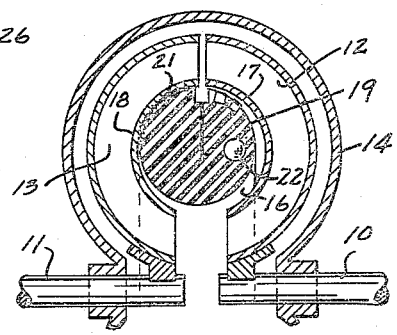
INVENTOR.
PORTER LANDRUM
BY
ATTORNEYS United States Patent Office 2,854,107
Patented Sept. 30, 1958

2,854,107

CENTRIFUGAL CLUTCH FOR HYDRAULIC TRANSMISSIONS AND THE LIKE

Porter Landrum, Birmingham, Ala.

Application June 8, 1953, Serial No. 360,178

1 Claim. (Cl. 192—3.2)

This invention relates to hydraulic transmission mechanism, and has for an object the provision of a simple automatic clutch for such transmissions whereby upon the attainment of a predetermined speed the driving and driven elements of the transmission are coupled together and relative angular motion between the two is precluded.

A further object of my invention is to provide, in a hydraulic transmission, an expansible clutch member interposed between the driving and the driven elements which shall be operable to provide a mechanical connection between the driving and the driven elements at a predetermined speed.

A still further object of my invention is to provide a clutch, operable at a predetermined speed, to engage the driving and driven members in a hydraulic transmission which shall be particularly applicable to such a transmission including a torque converter.

As is well known in the art to which my invention relates, the transmission of power by hydraulic means, while very advantageous for many uses, has, even with the most efficient apparatus heretofore proposed, involved a considerable loss of energy which has necessarily been dissipated as heat. This has been brought about by the necessity in such transmissions of relative motion or slippage between the pressure producing elements and the pressure utilizing or driven elements of the transmission mechanism. In order to overcome this loss, various forms of mechanical clutches have heretofore been proposed for locking the driving to the driven element upon the attainment of a predetermined speed, but all of these, with which I am familiar, have been complicated of design and operation and expensive to manufacture.

Hydraulic transmission apparatus, as heretofore known to me has usually comprised a driving shaft to which was connected a driving pump member, and a driven shaft to which was connected a driven turbine member. The pump member and turbine member face each other and define between them an annular chamber or core, more or less cylindrical in cross section, which heretofore has served no useful purpose and has been filled with the hydraulic fluid employed in the transmission. In accordance with my invention I mount in this annular chamber an expansible clutch member which may be made of an elastic rubber compound having the required frictional characteristics and which, upon the attainment of a predetermined speed, expands and engages the pump element with the turbine element. Thereafter, so long as the speed is maintained, the two are in locked engagement and there is no relative motion between them.

With a simple hydraulic transmission which includes only a pump element and a turbine element the clutch member may be secured to the inner blade shroud of the turbine element in such a way as to expand and engage the inner blade shroud of the pump element when the driven shaft has attained the predetermined speed. In another form of my invention, where the transmission includes a torque converter, the clutch member may be mounted over the inner blade shroud of the converter to expand and engage both the pump and the turbine elements when the driven shaft has attained a predetermined speed. With either form the ring may be slit transversely to form surface segments each of which is slit diagonally whereby, when the ring expands and engages the pump and turbine elements, a wedging action occurs which causes the clutch element to grip tighter.

Apparatus embodying features of my invention is illustrated in the accompanying drawings, forming a part of this application, in which:

Fig. 1 is a sectional view illustrating the application of my invention to a simple form of hydraulic transmission;

Fig. 2 is a sectional view of a well-known form of automotive hydraulic transmission including a torque converter and having my improved clutch member installed therein;

Fig. 3 is a detail sectional view of the pump and turbine elements shown in Fig. 2, and with the clutch element engaged; and, Fig. 4 is a detailed view, partly in section, of the clutch element.

Referring to the drawings for a better understanding of my invention, I show in Fig. 1 a driving shaft 10, and axially aligned therewith a driven shaft 11. Mounted on the driving shaft 10 is the pump element 12 of a hydraulic transmission and mounted on the driven shaft 11 is the turbine element 13. Surrounding the pump and turbine elements 12 and 13 is a housing 14. Only half of the parts described is here illustrated, it being understood that the other half is similar. The particular form of hydraulic transmission illustrated is well-known and requires no detailed description, it being understood that hydraulic fluid from a suitable source, not shown, is supplied and substantially fills the housing 14.

The pump element 12 and the turbine element 13 define between them an annular chamber 16, cylindrical in cross section, which is bounded by the inner blade shroud element 17 of the pump element and the inner blade shroud element 18 of the turbine element. In accordance with my invention, I vulcanize, or otherwise secure, to the shroud element 18 an elastic ring 19 which may be made of a rubber compound having the required elasticity and friction coefficient. The ring 19 is slightly smaller in diameter than the cross-sectional diameter of the annular chamber 16 and, by being secured to the shroud element 18 is thus slightly eccentrically disposed with respect to the annular chamber 16. Preferably, the ring 19 is secured to the shroud element 18 in the upper quadrant of the ring, as shown at 21, whereby, responsive to centrifugal force, the ring stretches and moves into engagement with the blade shroud 17 of the pump element 12. A ring 19 may be selected having the required elasticity to lock the pump element 12 into engagement with the turbine element 13 upon attainment of a predetermined speed by the turbine element. If required, additional weight in the form of metal balls 22 may be incorporated in the free side of the ring 19.

Referring now to Fig. 2 of the drawing, I show a well-known form of automotive hydraulic transmission in which the fly wheel 25 of an automotive engine is operatively connected to the pump element 26 of the transmission. At 27 is shown the driven shaft of the vehicle to which is operatively connected the turbine element 28 of the transmission. Included in the transmission is a stator or torque converter 29 which is rotatively mounted on a sleeve 31, the latter being splined to a stationary collar 32 through which the shaft 27 extends. The inner blade shroud of the pump element 26 is shown at 33 and the inner blade shroud of the turbine element 28 is shown at 34. The inner blade shroud of the stator, or torque converter 29, is shown at 36. As is well understood, an overrunning clutch element (not shown) is usually provided between the stator 29 and the sleeve 31 to limit rotation of the stator to one direction only.

In accordance with my invention I mount an elastic clutch element 37, in the form of a rubber ring, over the inner blade shroud 36 of the stator 29. With this form of my invention it is not necessary that the ring be secured to the stator but preferably is stretched over it so as to be joined to it by the elasticity of the ring and thereby rotate with the stator. The ring 37 is of such diameter as nearly to fill the annular chamber 38 formed between the pump element 26 and the turbine element 28, there being just sufficient clearance between the ring and the blade shrouds 33 and 34 for the pump element and turbine element to turn freely relative to each other until the speed of the stator approaches a predetermined speed whereupon the clutch ring expands responsive to centrifugal force and couples the pump element and turbine element together.

As is well understood with transmissions of the type illustrated in Figs. 2 and 3, the torque converter 29 is stationary at low speeds, or when starting up but, when the speed of the turbine element 28 approaches that of the pump element 26, it rotates at substantially the speed of the turbine element, carrying with it the elastic ring clutch 37.

In order to insure positive gripping action between the elastic clutch member 37 and the pump and turbine elements of the transmission, I may insert a multiplicity of small corks 39, or other suitable friction members into the outer surface of the ring. Also, I may slit the ring at intervals diagonally across, as shown at 41, to form shallow segments transversely of the ring. Other slits 42 extend at an angle longitudinally of the ring and join the slits 41 so that, when the ring 37 grips the pump and turbine elements, the portions 43 and 44 formed in each of the segments move longitudinally relative to each other to produce a spreading, or wedging action between the ring and the elements of the transmission. In order that the wedging segments 43 and 44 are each gripped only by one of the transmission elements I provide an annular groove 46 which passes centrally around the clutch ring so that each wedging segment lies wholly on one side of the ring. I thus provide for a strong, positive, gripping action between the ring and the pump and turbine elements of the transmission insuring that they become coupled together with no relative motion when the required speed has been obtained. The wedging action of the ring operates to bring about a quicker gripping of the driving and driven elements when the predetermined speed is attained and a quicker release when the speed falls below the predetermined speed.

From the foregoing it will be apparent that I have provided an improved automatic clutch element for hydraulic transmissions which is simple of design, economical of manufacture, and reliable in operation.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are specifically set forth in the appended claim.

What I claim is:

In a hydraulic transmission embodying a pump element and a turbine element defining between them an annular chamber cylindrical in cross section, an elastic clutch ring formed from a rubber compound and slit diagonally and longitudinally to form wedging segments, mounted in the chamber and disposed to rotate therein and upon the attainment of a predetermined angular velocity to expand and couple the pump element to the turbine element, and wedging elements formed on the clutch ring disposed to expand the ring laterally to grip the pump and turbine elements upon attainment of said predetermined angular velocity.

References Cited in the file of this patent

UNITED STATES PATENTS

| | | |
|---|---|---|
| 1,710,174 | Mauvillier | Apr. 23, 1929 |
| 2,235,673 | Dodge | Mar. 18, 1941 |
| 2,640,572 | O'Brien | June 2, 1953 |